United States Patent
Komine et al.

(10) Patent No.: US 7,680,815 B2
(45) Date of Patent: Mar. 16, 2010

(54) IMAGE ARRAY AUTHENTICATION SYSTEM

(75) Inventors: Hikaru Komine, Tokyo (JP); Katsuhiko Nakanishi, Tokyo (JP)

(73) Assignee: NEC Nexsolutions, Ltd., Tokyo (JP)

( * ) Notice: Subject to any disclaimer, the term of this patent is extended or adjusted under 35 U.S.C. 154(b) by 536 days.

(21) Appl. No.: 11/526,740

(22) Filed: Sep. 26, 2006

(65) Prior Publication Data

US 2007/0074119 A1 Mar. 29, 2007

(30) Foreign Application Priority Data

Sep. 27, 2005 (JP) .............................. 2005-280092

(51) Int. Cl.
*G06F 17/30* (2006.01)
(52) U.S. Cl. ........................ 707/102; 705/67; 713/155; 726/5
(58) Field of Classification Search .................. 707/102
See application file for complete search history.

(56) References Cited

U.S. PATENT DOCUMENTS

| | | | | |
|---|---|---|---|---|
| 5,559,961 | A | * | 9/1996 | Blonder ........................ 726/18 |
| 6,691,126 | B1 | * | 2/2004 | Syeda-Mahmood ......... 707/102 |
| 2002/0174060 | A1 | * | 11/2002 | Friedland et al. .............. 705/37 |
| 2004/0105431 | A1 | * | 6/2004 | Monjas-Llorente et al. .. 370/352 |
| 2005/0177750 | A1 | * | 8/2005 | Gasparini et al. ........... 713/201 |
| 2006/0147083 | A1 | * | 7/2006 | Piersol et al. ............... 382/100 |

FOREIGN PATENT DOCUMENTS

| | | | |
|---|---|---|---|
| GB | 2313460 | A * | 11/1997 |
| JP | 10-289210 | | 10/1998 |
| JP | 11-345206 | | 12/1999 |
| JP | 2002-258974 | | 9/2002 |
| JP | 2003-132290 | | 5/2003 |
| JP | 2003-228553 | | 8/2003 |
| JP | 2004-157675 | | 6/2004 |
| JP | 2004-213117 | | 7/2004 |
| JP | 2005-071202 | | 3/2005 |
| JP | 2007-520781 | | 7/2007 |

OTHER PUBLICATIONS

Japanese Patent Office issued a Japanese Office Action dated Sep. 2, 2009, Application No. 2005-280092.

* cited by examiner

*Primary Examiner*—Neveen Abel Jalil
*Assistant Examiner*—Son T Hoang
(74) *Attorney, Agent, or Firm*—Young & Thompson

(57) ABSTRACT

A user data management apparatus for connection to a terminal data processor used by a user through a network, registers data that is dependent on a user ID peculiar to the user. The user data management apparatus has a first unit for generating a first data registration screen, when data of the user is to be initially registered, which differs from user ID to user ID, and a second unit for displaying, on the terminal data processor, a second data registration screen based on the first data registration screen generated by the first unit, when the data of the user is to be registered.

8 Claims, 9 Drawing Sheets

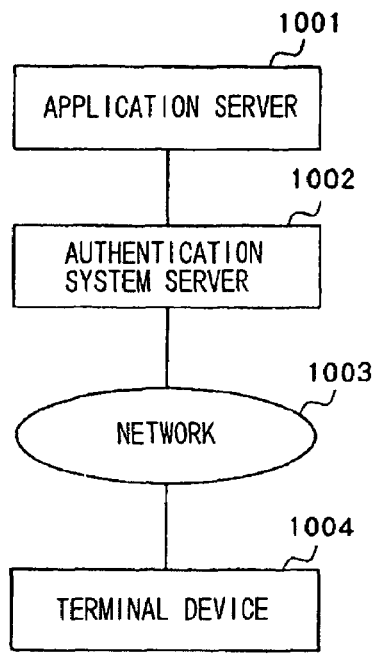

IMAGE ARRAY AUTHENTICATION SYSTEM

BACKGROUND OF THE INVENTION

1. Field of the Invention

The present invention relates to an apparatus for and a method of managing registered data depending on user IDs particular to respective users, and more particularly to an apparatus for and a method of managing data for preventing phishing.

2. Description of the Related Art

In recent years, plagiarizing authentication identifiers (IDs) and codes (passwords) by using deceptive Web sites has becomes prominent as criminal activity on the Internet. The fraudulent acquisition of IDs and passwords is equivalent to stealing a communication procedure, or stated otherwise is equivalent to stealing, a "key" for decrypting information that has been encrypted according to any of various processes and stored in a memory device. No matter how strong an encryption algorithm or a key may be, the protected information can easily be decoded the key is stolen.

According to all kinds of encryption processes that have already been invented at present, it is important to pay careful attention to the management and handling of the "key" as well as increasing their resistance to decoding attempts. Key exchange mechanisms that are incorporated in communication protocols are somewhat vulnerable to attacks at the stage of issuing a key or in the stage of an initial communication handshake.

Effective countermeasures against phishing attempts from fake websites have not yet been invented because phishing is a relatively new form of criminal activity and the Web system which is highly versatile and flexible cuts two ways. Techniques are available to copy image data and HTML data with ease and even to alter the address bar that is the only identification point for the user.

Irrespective of any complex security protection provided in websites managed by website administrators themselves and communication means on networks that are used, insofar as users are authenticated using IDs and passwords, it is impossible to prevent websites from being faked and personal information can easily be stolen through such deceptive websites.

Specifically, fake websites can be generated quite easily by fake website construction tools that are available in hacker networks. Phishing crimes are usually committed by using e-mails to lure users to deceptive websites. According to a typical phishing process, the phisher sends to a user an e-mail containing a message that is designed to trick the user into:

(1) updating user information by saying that the existing user information is going to be outdated; or (2) visiting a deceptive website by pretending that there has been a business transaction involving the user, and attempts to steal the user's ID and password through the updated user information or the deceptive website.

A certificate to be preinstalled in a client computer and software including a protocol for biometrics authentication are disclosed in JP-A No. 2002-258974. There is no doubt that the disclosed technology is effective to prevent the of phishing crime.

JP-A No. 2003-132290 discloses an authentication system using image information.

JP-A No. 2005-71202 reveals an authentication system using an array of image information representing checking symbols. The disclosed authentication system is effective to prevent spoofing and website faking through personal authentication of websites.

JP-A No. 2004-213117 discloses a process of reentering a random number, that is temporarily generated depending on a predetermined graphic pattern, into a password field.

JP-A No. H10-289210 discloses an input means for allowing a user who is unaccustomed to computer operation to easily enter authentication information using image information.

Installing a certificate in a computer poses a certain limitation on the convenience of the user because the user is restricted to the computer for use as a terminal. A system which needs biometrics authentication requires that biometrics authentication apparatuses themselves be in widespread use. Incorporating biometrics authentication into systems that are under threat of phishing crimes, such as retail banking services, is subject to the common use of biometrics authentication apparatuses in the social infrastructure.

Even if a fake website pretending to be a certain original website does not accurately recreate the behavior of the original website, it is possible for a user to enter an ID and a password into the fake website once the user trusts the deceptive website or through mere negligence.

In order to prevent fraudulent transactions through phishing, it is important to provide servers with technical measures for preventing malicious individuals from easily making fake websites and also for preventing IDs and passwords from being stolen.

The authentication technology based primarily on IDs and passwords suffers from the following problems:

The first problem is that characters entered from keyboards to produce passwords belong to a code system which is commonly used in the world that is referred to as character codes such as ASCII, UNICODE, or the like. The number of characters is limited, and all alternatives to them are already known commonly to all users including criminal phishers.

The second problem is that site certificates and authentication components installed in clients for confirming the site certificates fail to address vulnerability created by easy construction of fake websites.

SUMMARY OF THE INVENTION

It is an object of the present invention to provide a technology uses information which can hardly be copied and which is represented by an array of stored images, the total number of which is unknown, selectable according to a plurality of selecting processes, as a first key for user authentication, in combination with a plurality of existing coding techniques to make it difficult to duplicate an authentication screen, thereby preventing user's personal information and website management resources from being targeted by phishing attempts.

According to an aspect of the present invention, there is provided a user data management apparatus for connection to a terminal data processor used by a user through a network, for registering data depending on a user ID particular to the user, comprising first means for generating a first data registration screen, which differs from user ID to user ID, when data of the user is initially to be registered, and second means for displaying, on the terminal data processor, a second data registration screen based on the first data registration screen generated by the first means, when the data of the user is to be registered.

According to another aspect of the present invention, there is provided a user data registration apparatus for registering data depending on a user ID particular to a user, comprising a display unit, first means for generating a first data registration screen, which differs from user ID to user ID, when data of the user is initially to be registered, and second means for displaying, on the display unit, a second data registration screen based on the first data registration screen generated by the first means, when the data of the user is to be registered.

In either of the above user data registration apparatuses, the first means may hash a character string obtained from either one of a plurality of elements making up the user ID with respect to a constant assigned to a predetermined picture, thereby producing message digest character strings, may produce relocating identifiers particular to the user by sequentially sorting the message digest character strings, may mask a predetermined range of the relocating identifiers from the beginning thereof, and generate the first data registration screen from the relocating identifiers outside of the predetermined range; and the second means may dehash the first data registration screen generated by the first means to produce the constant assigned to the predetermined picture, may hash a character string obtained from either one of those of the elements making up the user ID which are elements other than used to generate the first data registration screen, thereby producing message digest character strings, may sequentially sort the message digest character strings, extract the position of the constant therein, and extract identifiers required to form an image at the position, thereby generating the second data registration screen.

In the user data registration apparatus for connection to the terminal data processor used by the user through the network, the second means may perform a one-time session to display the second data registration screen on the terminal data processor.

According to the present invention, information which can hardly copied and which is represent of an array of images, the total number of which is unknown, incorporating a plurality of authenticating methods therein, is used as a first key for user authentication, in combination with a plurality of existing coding techniques to make it difficult to duplicate an authentication screen, thereby preventing the user's personal information and website management resources from being targeted by phishing attempts.

Authentication screens provided by web systems and intranet systems, authentication screens provided by personal authentication systems for cellular phone, and transaction code entry screens require that user passwords be entered. According to the present invention, the user data registration apparatus is used to provide a substitute for the entry of passwords or is used to complement the protection of password information. The user data registration apparatus performs a general-purpose procedure for transmitting authentication information between a computer that hold user management information and a computer (including a cellular phone terminal capable of displaying images) that is connected as a client to the computer.

When a phisher attempts to falsify a website incorporating the user data registration apparatus according to the present invention, the phisher needs to obtain a set of image information identifiers particular to a user. A phishing attempt is made by sending a large number of e-mails to users to trick some unaware users into surrendering personal information due to slight negligence on the part of the users. If the phisher is unable to accurately recreate image information identifiers selectable by each of the users, then it is apparent that the success rate of phishing crimes will be greatly lowered.

It is very rare for a false website to be able to recreate an image which is the same as an image corresponding to a certain ID, as is evident from the following equations:

If "m" represents the number of images that can be selected per column displayed on the terminal data processor of a user and "n" the total number of image identifiers, then under the condition that no wild card is to be used, the total number of combinations in which n to m images are selected is $nCm$. If the number m of selectable alternative images is "5", then the probability that a false website can recreate a legitimate image can be determined by multiplying a value produced:

(total number of combinations of m selectable alternative images including an image which is the same as the image selected by the user)÷(total number of combinations of m selectable alternative images which can be extracted from all images)

the number of displayed columns.

Condition setting 1: Total number of images: 4096. 5 columns displayed. Number of selectable alternative images per column: 5

$$(4095C4)/(4096C5) \times 5 = 1/368934881474191.$$

0.3232 (about 1/370 trillions)

Condition setting 2: Total number of images: 256. 5 columns displayed. Number of selectable alternative images per column: 5

$$(255C4/256C5) \times 5 = 1/351843720.88832$$

(about 1/350 millions)

Condition setting 3: Total number of images:

256. 4 columns displayed.

Number of selectable alternative images per column: 5

$$(255C4/256C5) \times 4 = 1/6871947.6736 \text{ (about 1/6.8 millions)}$$

where C represents combination.

According to the present invention, the total number of pictures and characters and the entire range of pictorial symbol designs are unknown. Even if a fake website creator is successful in having a user enter the user ID, since it is not easy to select image identifiers, the user data registration apparatus according to the present invention is effective in preventing the password from being stolen.

In a scenario where a password is used in combination with a user ID, if the user ID and the password are stolen, but the mechanism for selecting an array of image identifiers is not stolen, through a deceptive website, then the array of image identifiers cannot be stolen. Because the limited set of image identifier alternatives particular to the user is not known, the fake website creator has to place an array of all possible known image identifiers in an authentication screen in order to attempt to appropriate the array of image identifiers. As all possible known image identifiers need to be displayed which is by necessity beyond the capacity of one screen, the authentication screen and the selecting mechanism will be disrupted. Stated otherwise, even if fake components are produced and a displayed screen of slot columns is imitated, the desired image identifier alternatives cannot be reached unless the screen is clicked tens of thousands of times.

The advantages of the present invention as compared with the patent documents referred to above will be described below.

The authentication system which is disclosed in JP-A No. 2003-132290 is similar to the present invention in that it uses image information. However, the disclosed authentication system is different as to process and advantages from the present invention in that (1) an image is distributed in advance, and (2) a user-specific encryption table is produced.

According to the present invention, a website is protected from phishing attempts by preventing the website from being falsified, and it is not necessary to distribute in advance key information of an image that can duplicate an encryption table.

The invention disclosed in JP-A No. 2005-71202 is concerned with an authentication system using an array of image information that represents checking symbols. The disclosed authentication system is similar to the present invention in that it is effective in preventing spoofing and website faking through personal authentication of websites.

However, the disclosed authenticating process is based on a simple selection of images by repeating multiple steps, and is not aimed at "concealing the entirety of image information" which is the basis for the present invention.

According to the present invention, selecting images is merely one element of a plurality of selectable authentication variations. Specifically, the present invention is different from the disclosed authenticating process as regards concealing the entirety of image information incorporating a plurality of selecting methods overlaying an image, and as regards the means for transmitting the image information itself.

The invention disclosed in JP-A No. 2004-213117 relates to a process of reentering a random number, that is temporarily generated depending on a predetermined graphic pattern, into a password field. The disclosed process is a dynamic key generating process for indicating the position of a certain graphic pattern on a matrix, and is similar to the present invention in that it prevents spoofing by using an image information matrix and is effective to prevent passwords from being stolen. However, the disclosed process is in the end process of simply selecting image information in one-to-one correspondence, and allows a website to be easily faked by copying all the images. The disclosed process is not aimed at "concealing the entirety of image information" which is a basis for the present invention, and is different from the present invention in terms of protecting a website from phishing attempts by preventing the website from being falsified.

The invention disclosed in JP-A No. H10-289210 relates to an input means for allowing a user who is unaccustomed to computer operation to easily enter authentication information by using image information. The disclosed input means is similar to the present invention in that the position of a bitmap icon is used as the authentication information. However, the disclosed process is not aimed at "concealing the entirety of image information" which is a basis for the present invention, and does not generally serve to prevent websites from being falsified.

The present invention serves to protect a website from phishing attempts by preventing the website from being falsified, and is different from the disclosed process as regards means for achieving website protection and also as regards advantages thereof.

BRIEF DESCRIPTION OF THE DRAWINGS

FIG. 1a is a block diagram of a general configuration of a system according to an embodiment of the present invention;

FIG. 1b is a view showing a log-in screen acquired by a terminal device shown in FIG. 1a when the terminal device is connected to an application server shown in FIG. 1a;

DETAILED DESCRIPTION OF THE PREFERRED EMBODIMENT

Figure 2A:
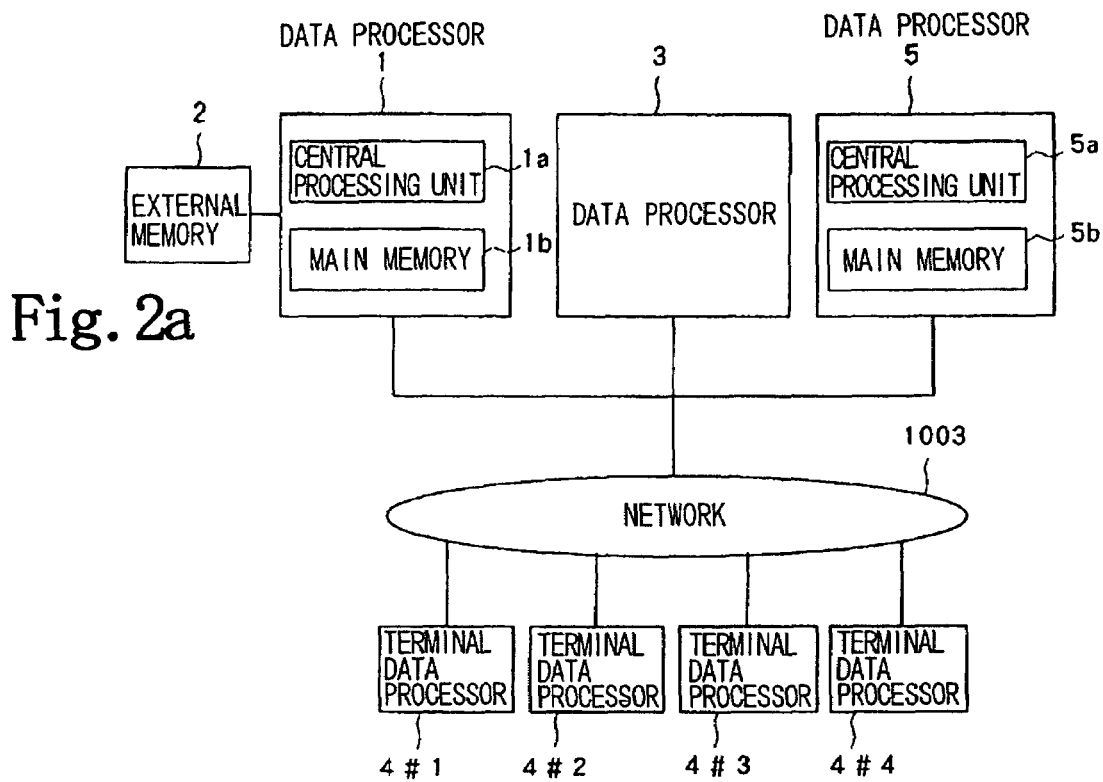
FIG. 2a is a block diagram of a detailed configuration of the system according to the embodiment of the present invention.

A preferred embodiment of the present invention will be described below with reference to the drawings.

FIG. 1a shows in block form a general configuration of a system according to an embodiment of the present invention.

As shown in FIG. 1a, application server 1001 is connected to network 1003 such as a LAN or a WAN through authentication system server 1002. Network 1003 is also connected to terminal device 1004. Therefore, terminal device 1004 is connected to application server 1001 through network 1003 and authentication system server 1002.

FIG. 1b shows a log-in screen acquired by terminal device 1004 when it connected to application server 1001.

The system according to the embodiment of the present invention will be described in detail below with reference to FIG. 2. FIG. 2 shows in block form a detailed configuration of the system according to the embodiment of the present invention.

As shown in FIG. 2, the system comprises data processors 1, 3, 5, external memory 2, network 1003, and terminal data processors 4#1 through 4#4.

Data processor 1 has central processing unit 1a and main memory 1b, and data processor 5 has central processing unit 5a and main memory 5b. Data processors 1, 5 and external memory 2 operate as authentication system server 1002 shown in FIG. 1. Data processor 3 operates as application server 1001 shown in FIG. 1. Terminal data processors 4#1 through 4#4 operate as terminal device 1004 shown in FIG. 1. Terminal data processors 4#1 through 4#4 will also be collectively referred to as terminal data processor 4.

External memory 2 and data processors 1, 3, 5 may be provided by logical connections using an internal bus in a single data processor so that they are constructed in a single device. If the system is used as a built-in user authentication system, then external memory 2, data processors 1, 3, 5, and terminal data processors 4#1 through 4#4 may be included in a single self-contained system. The present invention covers these variations.

Figure 2B:
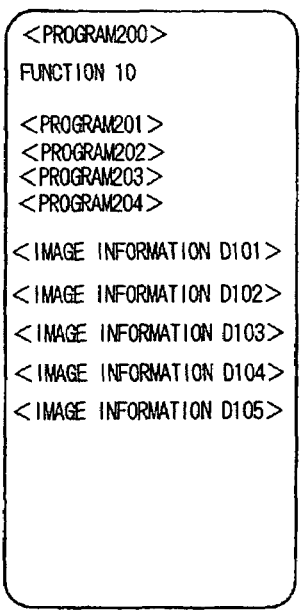
FIG. 2b is a diagram showing stored data in external memory 2.

FIG. 2b shows stored data in external memory 2. External memory 2 stores therein program 201 for generating an identifier group (image information D102) particular to image information (image information D101), program 202 for generating image relocating identifiers particular to each user, program 203 for setting an identifier group (image information D103) masked (excluded) with a certain regularity by relocated image identifiers, program 204 for regularly extracting image identifier group data (image information D104) not included in the identifier group masked by program 203, and program 200 for realizing function 10 which generates image identifiers in data processor 1, and function 11 which registers user information in data processor 5.

Data processor 1 loads image information and programs 200 through 204 from external memory 2, and executes programs 200 through 204 by using central processing unit 1a and main memory 1b. When program 200 is thus loaded and executed, function 10 for generating image identifiers is realized in data processor 1.

Data processor 5 loads program 200 from external memory 2 and executes program 200 by using central processing unit 5a and main memory 5b. When program 200 is thus loaded and executed, function 11 for registering user information is realized in data processor 5.

Data processor 3 has program X for realizing a system which requires personal identification, e.g., a banking system, an auction site, a shopping site, etc.

Figure 2C:
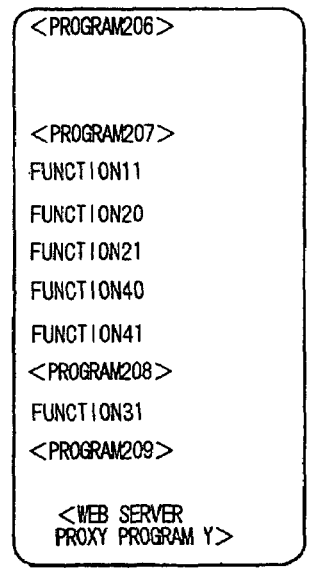
FIG. 2c is a diagram showing stored data in a memory (not shown) of data processor 5.

FIG. 2c shows stored data in the memory (not shown) of data processor 5. The memory of data processor 5 stores therein program 206 for realizing function 50 for loading image information and image identifier group 103 extracted by program 204 from data processor 1, program 207 for realizing function 11 for delivering an image-array-type authentication information for the user to terminal data processor 4 and also for realizing functions 20, 21, 40, 41, program 208 for realizing function 31 for verifying an image array selected by the user, program 209 for receiving and verifying authentication information of the user, and web proxy server program Y for mediating communications between application X run on data processor 3 and terminal data processors 4#1 through 4#4.

Data processor 5 has, in addition to the above memory, central processing unit 5a and main memory 5b for loading and executing image identifier group data 101 through 104, programs 204 through 209, and program X.

Figure 2D:
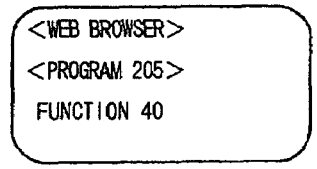
FIG. 2d is a diagram showing stored data in a memory (not shown) of each of terminal data processors 4#1 through 4#4.

FIG. 2d shows stored data in the memory (not shown) of each of terminal data processors 4#1 through 4#4. The memory of each of terminal data processors 4#1 through 4#4 stores therein program 205 for realizing function 40 for loading a web browser or an authentication screen.

Though program X and program Y are elements required by the system according to the present embodiment, they will not be described in detail below as they are of a known nature.

The system according to the present embodiment operates according to inputs applied to terminal data processors 4#1 through 4#4 by system users who use respective terminal data processors 4#1 through 4#4. The functions constructed in the above components of the system by the corresponding programs include operations to display screens to prompt the system users to enter inputs and also operations to accept inputs from the system users based on the prompting screens. Since these displaying operations and accepting operations are also of a known nature, they will not be described in detail below. Operational details of the functions will be described below.

Function 10:

Function 10 is provided in data processor 1 according to program 200 stored in external memory 2. Function 10 generates user authentication information whose details differ from system user to system user, as image information D104.

Figure 3A:
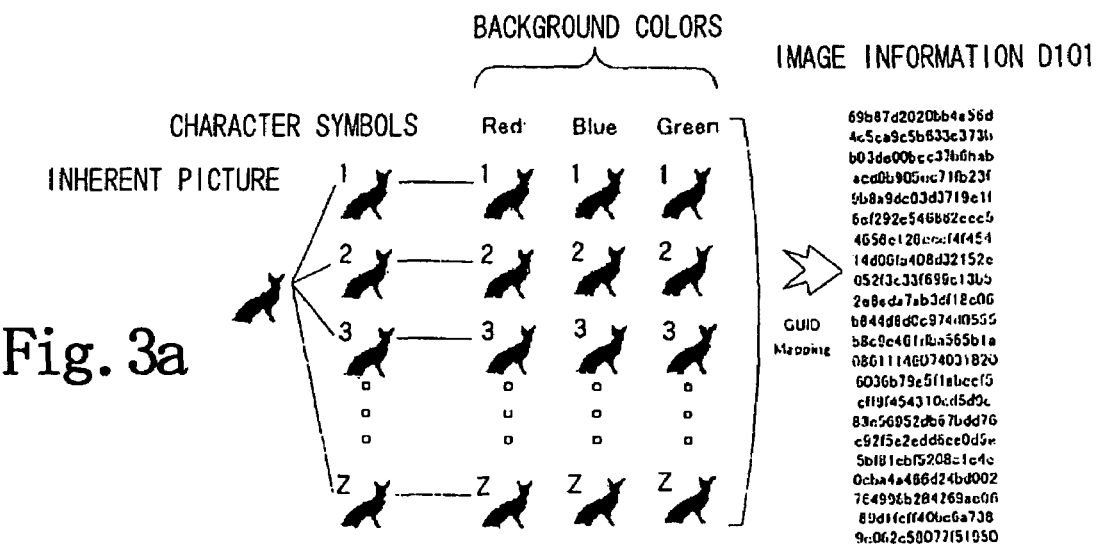
FIG. 3a is a diagram showing alternatives for making up image information D101 through D104.
Figure 3B:
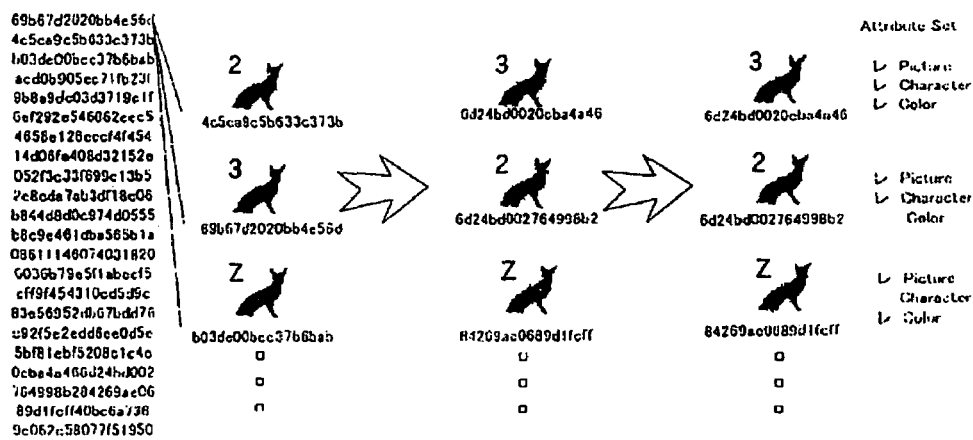
FIG. 3b is a diagram showing various other image information generated from image information D101.

FIGS. 3a and 3b show details of image information D101 through D104.

All data groups included in image information D101 represent pictures. As shown in FIG. 3a, alternatives to the pictures include:

(1) inherent pictures;
(2) character symbols; and
(3) background colors of the pictures.

These alternatives are combined as desired to generate image information D101 representing pictures. Image information D101 is stored in advance in external device 2. However, image information D101 may be selected depending on the instruction entered by the system user. Image information D101 is identified by a combination of a picture, a character, and a background color.

Examples of alternatives are as follows:
"*dog3", "redcat4", "6", "*", "red**"

Of the three alternatives to each combination, two or more alternatives may be specified, or a single alternative may be specified, or no alternative may be specified as a wild card (any alternatives selected by the user for a combination or a column meet conditions). The system user may select an array of combinations or columns "blackdog*", "blackcat*", "black*7", "black*6", and "black*5" in order to memorize the complex image array with ease. According to the wild card mechanism, it is possible to provide an authentication pass for "changing the fourth combination to an image having a certain background color". The system user specifies control processes for requiring upon registration that n or more alternatives be included and for inhibiting a wild card from being specified, according to application X depending on the security policy of the website operator which is provided in data processor 3.

FIG. 3b shows various other image information generated from image information D101.

ID character strings (unserial) as constants are assigned to image information D101. ID character strings are combined with a hashed character string obtained from inherent information, which represents name, ID, password, address, date of birth, and gender, indicated by the user ID of the system user, thereby producing a message digest from the ID character strings as constants. At this time, an algorithm having a hash function with a key, typically HMAC-MD5 or an equivalent or better, is employed.

The character strings of the obtained message digest are sequentially sorted to produce image information D102 having a relocating identifier particular to the user (personalization).

Image information D102 is then masked so that a certain range from the beginning thereof (about 50% of the total number of images) will be excluded from subsequent extraction, thereby producing image information D103.

Then, one column of image identifiers to be output to the authentication screen is extracted from the beginning of an array of image identifiers. Thereafter, second, third, and subsequent columns of image identifiers are extracted. The number n of extracted lines is variable depending on the security policy of the website. In this manner, image information D104 representing limited alternatives of image identifiers is obtained.

The system user selects an image to be assigned to an image array as authentication information and a selecting method therefor (an image, a character, a color, or a combination thereof), and clicks a transmission button. The image array of the user is transmitted, using a one-time URL, to data processor 1. Function 10 is now completed.

Image information D104 thus generated represents an image which is different from system user ID to system user ID. Function 11 provided by data processor 5 stores generated image information D104 in association with the user ID that is used to generate image information D104, in external memory 2.

Function 11:

Function 11 is used to send an image-array-type authentication screen for registering user information to terminal data processor 4.

Figure 4:
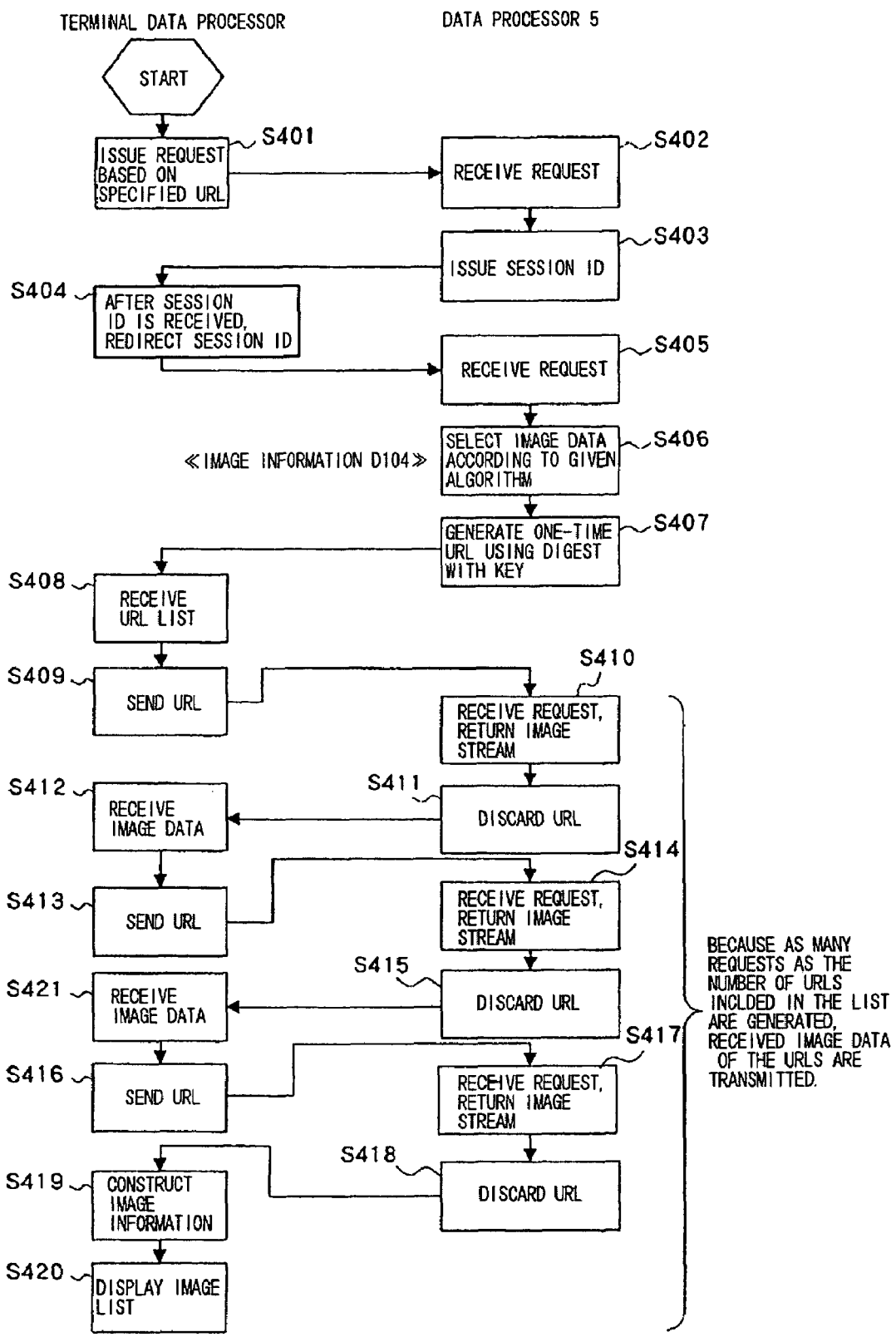
FIG. 4 is a flowchart of an operation sequence according to function 11.

FIG. 4 is a flowchart of an operation sequence according to function 11.

Operation of the system for allowing the system user to register user information from outside of the system will be described below with reference to FIG. 4. The system user operates terminal data processor 4 to send a request based on a specified URL to data processor 5 (step S401). Data processor 5 receives the request from terminal data processor 4 (step S402) and issues a session ID including the user ID to terminal data processor 4 (step S403). Terminal data processor 4 receives the session ID from data processor 5 and redirects the session ID to data processor 5 (step S404).

Steps S401 through S404 described above are performed for the following reason: When the system user wants to register user information from outside of the system, in a situation in which the URL of image data is fixed, the result is that the alternatives selected by the user may possibly be figured out by an analysis of the network or logging in to the network. Therefore, it is necessary for data processor 5, as a server, to send information in a one-time session, as described above in steps S401 through S404.

Data processor 5 receives the redirected request (step S405). Data processor 5 then selects and reads image information D104 stored in external memory 2 in association with the user ID represented by the request (step S406). Data processor 5 generates a list of one-time URLs generated by using the message digest with the key (hash value), and sends the URL list to terminal data processor 4 (step S407).

Terminal data processor 4 receives the URL list (step S408), and sends URLs included in the URL list (steps S409, S413, S416). Terminal data processor 4 sends each of the URLs included in the URL list. In FIG. 4, Terminal data processor 4 sends three URLs respectively (steps S409, S413, S416).

When data processor 5 receives the URLs from terminal data processor 4, data processor 5 sends image streams of the received URLs to terminal data processor 4 (steps S410, S414, S417), and thereafter discards the received URLs (steps S411, S415, S418).

Terminal data processor 4 receives the image data corresponding to the URLs sent in steps S409, S413, S416 (steps S412, S421, S419). Terminal data processor 4 confirms whether the sent image data is final image data or not. If the sent image data is final image data, then terminal data processor 4 constructs image information using the image data received so far (step S419), and displays the constructed screen information as an image list (step S420).

Steps S405 through S421 described above are performed for the following reasons: When the system user wants to register user information, the system user enters information representing name, address, mail address, etc. in a first screen. When the page is displayed, since the session ID for maintaining a communication session was issued from the web server, data processor 5 generates a hash value with a key which is in one-to-one correspondence to an actual file of image information, using the session ID character string as a key. The hashed URL is interpreted by program 207 to download desired image information.

Even if a third party seizes the session ID and the URL and attempts to acquire the image identifier list to be selected and the image information itself, the URL is invalid as it is a one-time URL.

Function 20:

Function 20 is a function for extracting image identifiers similar to function 10. However, function 20 employs a different process for generating key information to obtain a hash character string that is required to produce a permutated table. Whereas function 10 provides alternatives available for user registration, function 20 is required to generate a user authentication screen.

Figure 5:
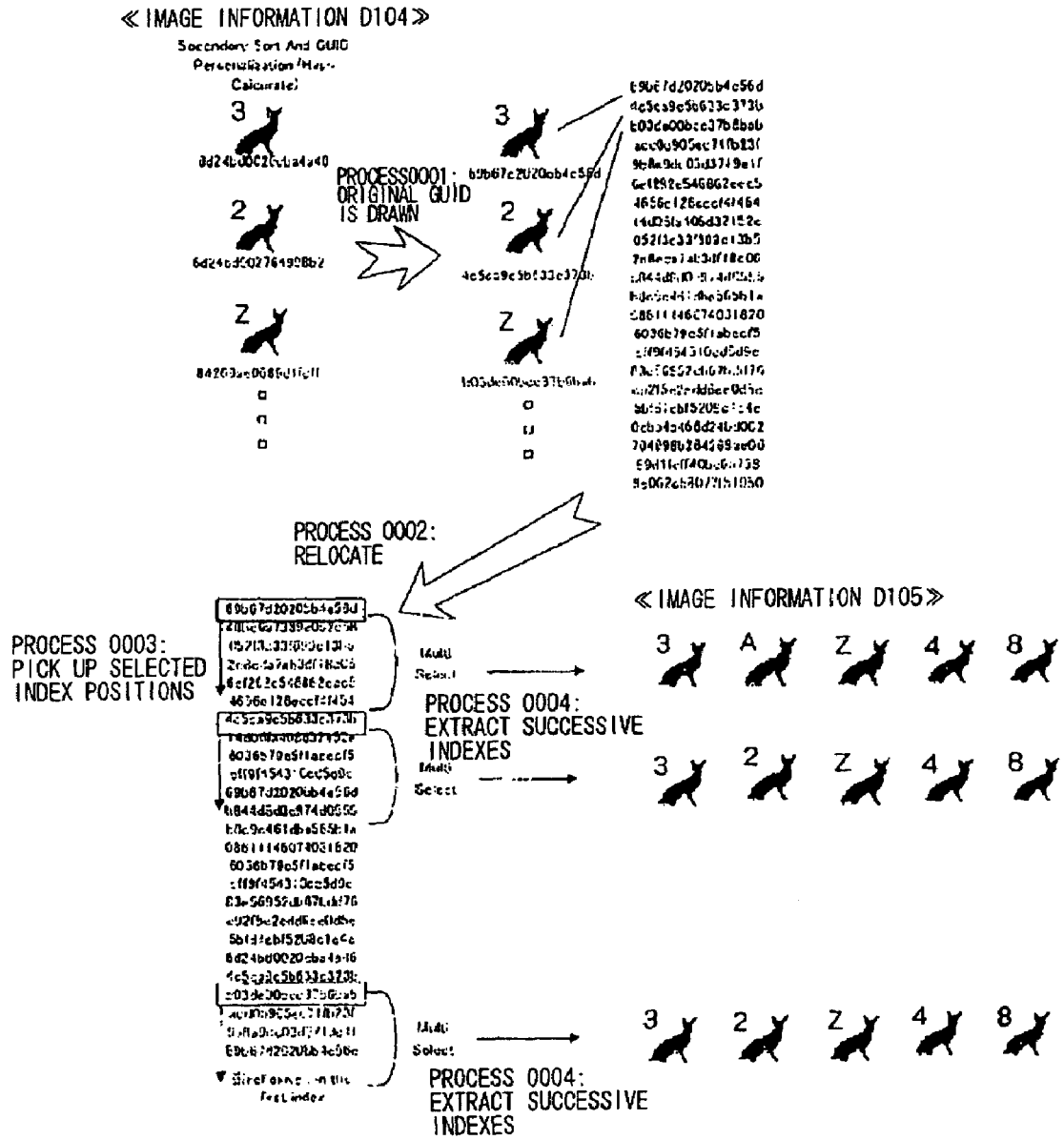
FIG. 5 is a diagram showing an image information generating process according to function 20.

FIG. 5 shows an image information generating process according to function 20.

According to function 10 described above, certain image identifiers are masked for extracting alternatives that can be selected. In the user authentication screen, the masked image identifiers can also be extracted as alternatives.

In order to obtain a list of masked image identifiers, the image array information selected by the user according to function 10 is dehashed to draw image identifiers prior to being sorted (process 0001 shown in FIG. 5).

Then, message digest character strings are relocated using key information different from according to function 10 (process 0002 shown in FIG. 5). The relocating algorithm is a permutation sort algorithm based on special characters.

Then, the position of the image identifier group drawn in process 0001 in the relocated list generated in process 0002 is extracted (process 0003 shown in FIG. 5).

Then, as many image identifiers (5 to 10 image identifiers) as are required for each slot column are extracted from the position in the relocated list extracted in process 1003 (process 0004 shown in FIG. 5).

The list of image identifiers extracted in process 0004 corresponds to a list of image identifiers (image information D105) sent to terminal data processor 4.

Function 21:

Function 21 is used to display an image set, which is different from system user to system user, on the terminal data processor 4 of the system user. If the image information is incorporated in all the components or is located so as to be downloadable at static addresses, then the image cannot be concealed as a whole. Therefore, the image information for interpreting the URLs is downloaded according to the one-time URL list through URL filters for interpreting the URLs (included in program 207).

The stream that is to be returned to the terminal data processor of the user may be sent by dynamically shaping the html so as to form an n×m image matrix. In addition, it is effective to increase the user's operability and safety by specializing the data format on the premise that images are plotted in slot columns according to componetization based on Macromedia FLASH or componetization based on Java applets or Microsoft ActiveX.

Function 30:

Function 30 detects that image information D103 masked in function 10 is entered for an authentication request. Function 30 determines how many of the alternatives correspond to image information D103 and performs a corresponding responsive process to find whether a simple user's selection error has occurred or whether an attack has been made in the form of a deceptive request by an external tool, and collects log data and issues a warning during operation.

Function 40:

According to function 40, image identifiers are selected in the user authentication screen. As described above with respect to function 21, there are some variations of methods for selecting image identifiers. Basically, however, the user selects images from n (variable depending on system settings)×m (limited set particular to the user) images according to the authentication process that has been established for registering authentication information.

Function 41:

Function 41 is performed when a password is used in combination with function 40. If an inquiry of an image identifier array is not approved, then the processing does not go to a password entry screen. In a componentized authentication screen, the password entry field is locked.

Operation of the System According to the Embodiment:

Operation of the system according to the present embodiment will be described in detail with reference to FIGS. 6 through 9.

System Initialization:

System initialization that is performed according to function 10 by data processor 1 will be described below.

Based on the characteristics of the present system, the system administrator is required to select, add, and exclude image arrays which the user is to use for user authentication and also to add image information identifiers (one identifier for one image) which are different from system to system. The image file should preferably be composed of pictures that the user finds easy to identify and remember, as shown in FIG. 1b.

Figure 6:
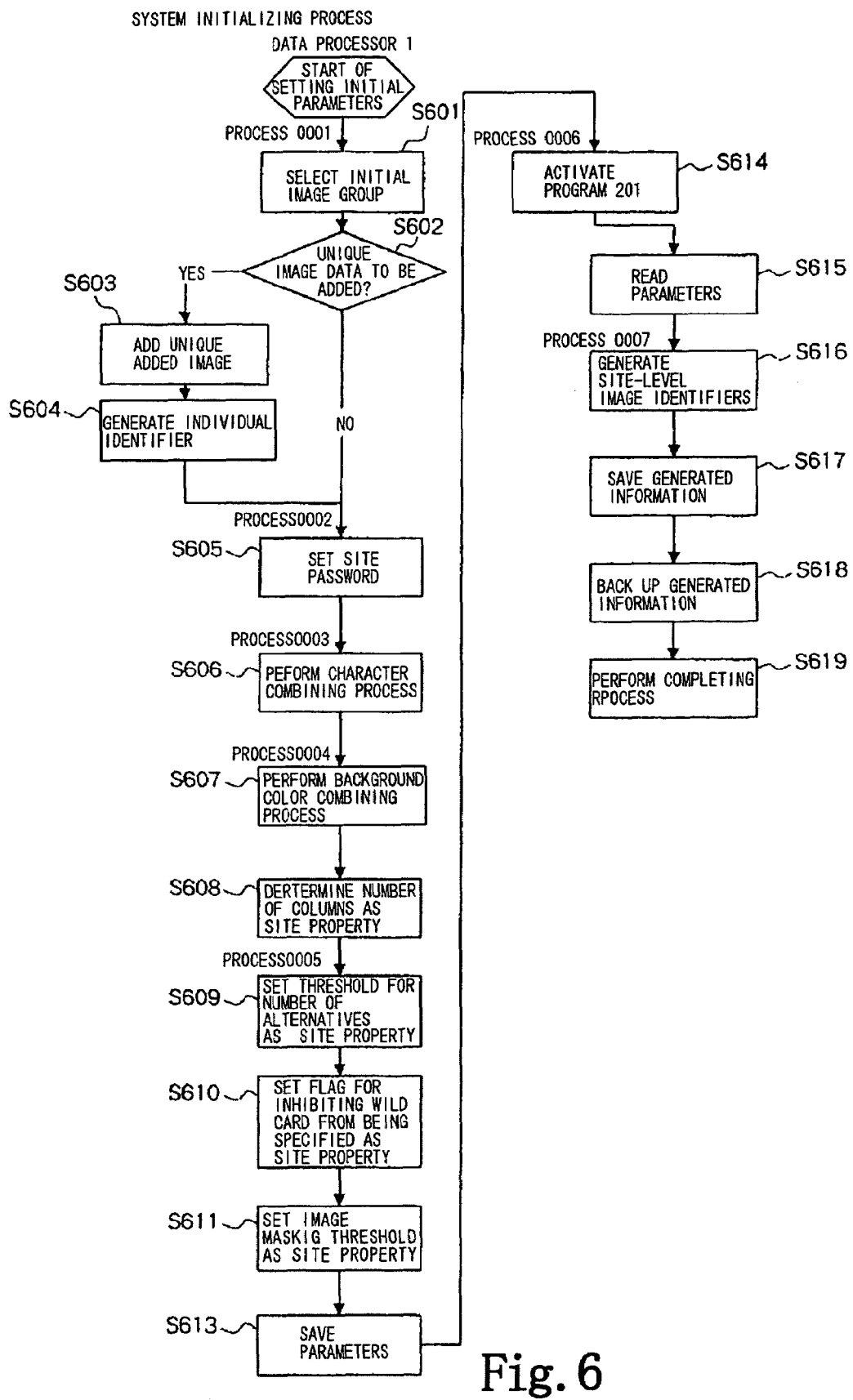
FIG. 6 is a flowchart of an operation sequence of the system according to the embodiment of the present invention.

When the setting of initialization parameters starts, an initial image group indicated as inherent pictures in FIG. 1b is selected (step S601, process 0001 shown in FIG. 6).

A selecting process to be described below according to the present embodiment refers to a process performed by a program-implemented means for displaying a screen to prompt the system user to enter an input and to make a response according to the entered input.

Then, the next step is confirm whether unique image data is to be added or not (step S602). If unique image data is to be added, then a unique image group is added (step S603), and an individual identifier corresponding thereto is generated (step S604).

Thereafter, a side password is set (step S605, process 0002 shown in FIG. 6), a character combining process is performed (step S606, process 0003 shown in FIG. 6), and a background color combining process is performed (step S607, process 0004 shown in FIG. 6). As a result, the generated image file represents a combination of three layers, i.e., a picture positioned in a central area, an alphanumeric character selected from 0-9 and A-Z, and a background color for the picture.

Then, in order to prevent simple authentication methods from being selected, control processes for requiring upon registration that a certain number of alternatives or more be included and for inhibiting a wild card from being specified are specified depending on the security policy of the website operator.

Specifically, the number of columns is determined as site property (step S608), and a threshold value for the number of alternatives to be selected is set as site property (step S609, process 0005 shown in FIG. 6). A flag for inhibiting a wild card from being specified is set as site property (step S610), and an image masking threshold is set as site property (step S611). These parameters are saved (step S613), and program 210 is activated (step S614, process 0006 shown in FIG. 6).

Program 201 generates an inherent identifier group (image information D102) with respect to image identifiers (image information D101) generated in steps S601 through S613 described above. According to program 201, the parameters saved in step S613 are read (step S615), site-level image identifiers are generated (step S616, process 0007 shown in FIG. 6), and the generated information is saved and backed up (steps S617, S618). Thereafter, the overall process is ended (step S619).

In operation, not only the single group of "animals", but also a plurality of pictures in the public domain which can easily be grouped, such as "flowers", "stars", or "vehicles", are selected and set up, so that the total number of concealed images combined with characters and background colors will be sufficiently large. The system administrator activates program 201 to perform process 0007. In this manner, new identifiers (global IDs which will hereinafter be referred to as GUIDs) are generated for all image arrays and stored in external memory 2.

A user registration process according to the present embodiment will be described below with reference to FIG. 7.

Figure 7:
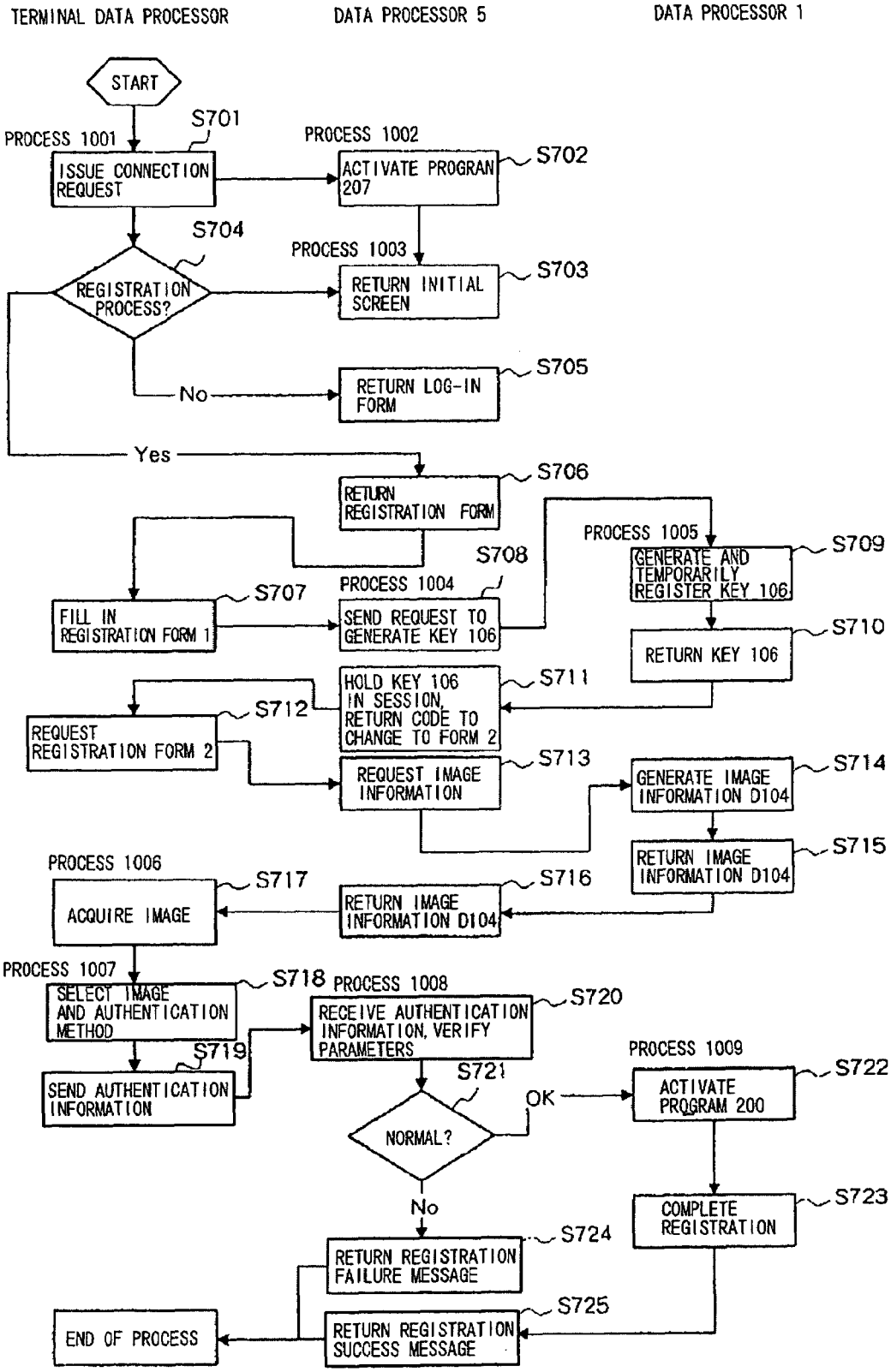
FIG. 7 is a flowchart of an operation sequence of the system according to the embodiment of the present invention.

The user registration process according to the present embodiment comprises user registration process 1 from steps S701 through S710 shown in FIG. 7 (process 1006 shown in FIG. 7) and user registration process 2 from steps S711 through S725 shown in FIG. 7. First, user registration process 1 will be described below.

User Registration Process 1:

The system user performs a registration process according to program 200 run on data processor 1 for setting an image array to serve as an authentication password of the user. To establish a connection route for user registration, terminal data processor 4 accesses the web server program on data processor 5 and issues a connection request thereto (step S701, process 1001 shown in FIG. 7).

In response to the connection request, data processor 5 activates program 207 having a registration form provided in the web server (step S702, process 1002 shown in FIG. 7). At this time, the system user does not yet own a user ID, an image array, and a password. Therefore, data processor 5 overwrites a user session that has not yet been logged in the URLs of a registration screen and an authentication screen (initial screen) of the user, and returns the URLs to terminal data processor 4 (step S703, process 1003 shown in FIG. 7).

Then, the system user confirms the registration screen or the authentication screen displayed on terminal data processor 4 (step S704). If the user enters an input that does not indicating the registration process into terminal data processor 4, then data processor 5 returns a log-in form (step S705).

However, if the system user enters an input that indicates the registration process into terminal data processor 4, then data processor 5 returns registration form 1 (step S706), whereupon an image (browser) for entering basic user information is displayed on terminal data processor 4.

Registration form 1 contains a plurality of pages. When the system user enters basic user information into registration form 1 (step S707), data processor 5 sends a request for generating key 106 to generate a hash value to data processor 1 (step S708).

Data processor 1 generates key 106 to generate a hash value using a random number that has been generated when data processor 1 has received the basic user information entered by the system user in step S707 (step S709, process 1005 shown in FIG. 7).

Generated key 106 is paired with a user registration number (user ID), and its value will stay the same even if part of the registered user information is changed unless the registered user information itself is deleted. Thereafter, data processor 1 returns generated key 106 to data processor 5 (step S710).

User Registration Process 2:

When entry of the basic user information is completed, the displayed pages are changed, and an image for selecting an image array is displayed.

Data processor 5 holds key 106 returned from data processor 1 in the session, and returns a code for changing to new form 2 (registration form 2) to terminal data processor 4 (step S711). Thereafter, when terminal data processor 4 requests registration form 2 from data processor 5 (step S712), data processor 5 requests image information (step S713) from data processor 1. Data processor 1 generates image information D104 and returns image information D104 to data processor 5 (steps S714, S715). Data processor 5 returns image information D104 to terminal data processor 4 (step S716), which acquires an image (step S717, process 1006 shown in FIG. 7) and displays registration form 2.

The system user sets as many image identifiers and selecting methods therefor as the number of columns from the displayed image data group (step S713, process 1007 shown in FIG. 7). The image identifier group selected by the input in step S718 is sent as an HTTP query to data processor 5 (step S719). In response to the HTTP query, program 207 on data processor 5 performs a verification of parameters including drawing image identifiers from one-time identifiers (step S720, process 1008 shown in FIG. 7).

Then, it is confirmed whether the verified result in step S720 is normal or not (step S721). If not normal, data processor 5 sends a message to terminal data processor 4 (step S724) indicating that the user registration has failed. Then, the user registration process is ended.

If it is judged that the verified result is normal in step S721, then data processor 5 inserts the selected image identifiers into the registered user information (image information D104) based on the given arguments (parameters), and sends the information structure to data processor 1. Data processor 1 activates program 200, and saves the sent information in memory 2, whereupon the user registration is completed (step S723, process 1009 shown in FIG. 7). Data processor 5 returns a message to terminal data processor 4 (step S725) indicating that the user registration has been successful. Then, the user registration process is ended.

The user registration process is now completed.

A user authentication process according to the present embodiment will be described below with reference to FIGS. 8 and 9.

Figure 8:
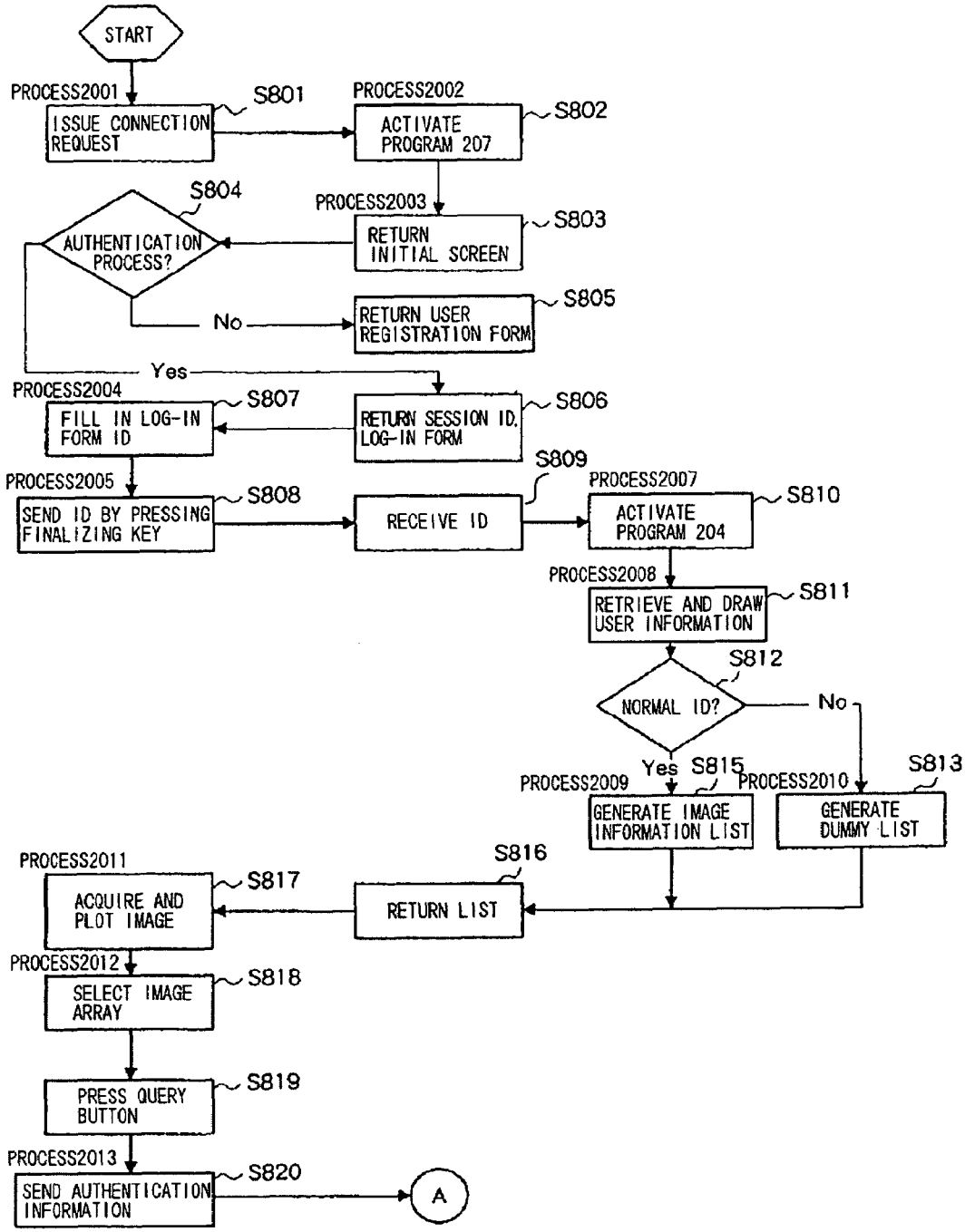
FIG. 8 is a flowchart of an operation sequence of the system according to the embodiment of the present invention.
Figure 9:
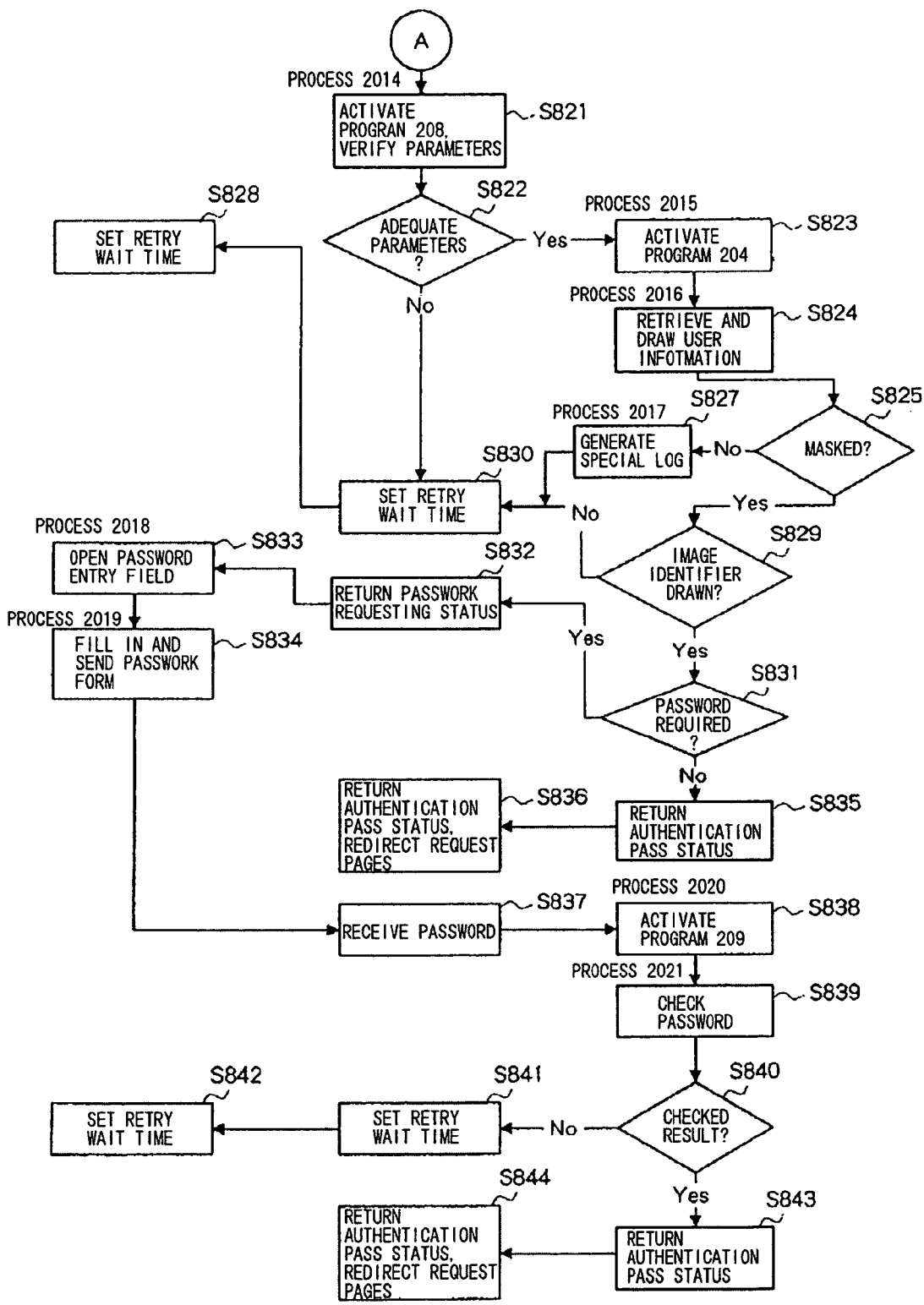
FIG. 9 is a flowchart of an operation sequence of the system according to the embodiment of the present invention.

The user authentication process according to the present embodiment comprises user authentication process 1 from steps S801 through S820 shown in FIG. 8 and user authentication process 2 shown in FIG. 9. First, user authentication process 1 will be described below.

User Authentication Process 1:

An operation sequence to be followed when the system user logs into the system will be described below.

For logging into the system, the system user enters an input to access the web server program run by data processor 5 into terminal data processor 1, which then issues a connection request (step S801, process 2001 shown in FIG. 8).

Data processor 5 activates program 207 (step S802, process 2002 shown in FIG. 8). Data processor 5 overwrites a user session that has not yet been logged in the URLs of a authentication screen and a registration screen (initial screen) of the system user to guide the user session to the authentication screen and the registration screen, and returns the URLs to terminal data processor 4 (step S803, process 2003 shown in FIG. 8).

Terminal data processor 4 displays the authentication screen and the registration screen of the system user, inquiring about the present process (step S804). Since the present process requires user recognition, the system user enters an input for responding to the authentication screen of the system user. Terminal data processor 4 returns a user registration form to data processor (step S805).

When data processor 5 receives the input for responding to the authentication screen of the system user, data processor 5 returns a session ID and a log-in form (step S806).

The system user enters its own user ID into a log-in screen based on the returned log-in form, and presses a finalizing key (step S807, process 2004 shown in FIG. 8). The entered user ID is sent from terminal data processor 4 to data processor 5 through SSL communications (step S803, process 2005 shown in FIG. 8).

Data processor 5 receives the user ID (step S809), activates program 204 on data processor 1 based on the received user ID (step S810, process 2007 shown in FIG. 8), and retrieves and draws user information (step S811, process 2008 shown in FIG. 8).

After the user information is retrieved in step S811, data processor 5 confirms whether the retrieved ID is a normal ID or not (step S812).

If the retrieved user ID is not a normal ID and if it is confirmed that the retrieving and drawing process has failed, then data processor 5 generates a one-time dummy image array identifier list using a hash value obtained from the entered user ID in order to prevent the existence of the user ID from being known by a possible attacker (step S813, process 2010 shown in FIG. 8), and returns the one-time dummy image array identifier list (step S816).

If it is judged that the retrieved user ID is a normal ID in step 812, then data processor 5 generates a one-time list of image array identifiers related to the user ID (step S815, process 2009 shown in FIG. 8), edits the list as an THML document, and returns the list (step S816) to terminal data processor 4 of the system user.

In order not to provide different response speeds, the algorithm for generating image information D 05 and the algorithm for generating the dummy list are not different from each other. According to the dummy list, the masking ratio is set to 100% to reduce unauthorized log-in attempts.

According to the image array identifier list (image information D105 or the dummy list) embedded in the received HTML document, terminal data processor 4 downloads desired image information (step S817, process 2011 shown in Fig.).

In the HTML file, the identifier of each image is assigned to a POST method argument of a FORM tag. The system user selects an image array to be used for authentication by clicking a button in the form (step S818, process 2012 shown in FIG. 8). After the system user selects image arrays in all columns, the system user clicks a "SEND" button (step S819), sending the information of image array identifiers to data processor 5 (step S820, process 2013 shown in FIG. 8).

According to a variation in method, the image identifiers and image data may not be included in an HTML file to be sent to the browser on terminal data processor 4 of the system user, but may be loaded into dedicated components on terminal data processor 4. Data processor 5 refers to a client header of a request source, lists selected image identifiers using an XML file or a CSV file format, rather than an HTML file for the browser, and sends the listed image identifiers. Program 207 determines whether the image identifier list is to be returned to the component or returned as a simple HTLM format, based on the expanded information on the HTTP request header sent from terminal data processor 4.

User Authentication Process 2:

Having received the information of image array identifiers from terminal data processor 4, data processor 5 activates program 208 to verify parameters of the information (step S821, process 2014 shown in FIG. 9), and confirms the adequacy of the request (the adequacy of the parameters) (step S822).

If it is confirmed that the parameters are adequate in step S822, then data processor 5 sends the information to data processor 1. Data processor 1 activates program 204 (step S823, process 2015 shown in FIG. 9) and draws user information (step S824, process 2016 shown in FIG. 9).

It is determined whether the information of image array identifiers sent to data processor 5 is masked or not (step S825), thereby verifying the adequacy of the request. If it is confirmed that the information of image array identifiers is not masked, then data processor 1 which runs program 204 refers to a detection threshold set in advance by the system administrator, generates a log indicating a dangerous situation (step S827, process 2017 shown in FIG. 9), and saves the log in memory 2. Thereafter, a wait time is set in data processor 5 and terminal data processor 4 (step S830, step S828) until a re-request is made.

Once it is confirmed that the information of image array identifiers is masked in step S825, it is then determined whether or not an identifier representing a masked condition (image information D103) is confirmed in the image array identifiers (step S829).

If an identifier representing a masked condition (image information D103) is not confirmed in the image array identifiers, then a wait time is set in data processor 5 and terminal data processor 4 (step S830, step S828) until a re-request is made.

If an identifier representing a masked condition (image information D103) is confirmed in the image array identifiers, it is then determined whether or not the present process is a user authentication process using a password (step S831).

Once it is confirmed that the present process is a user authentication process not using a password in step S831, data processor 1 then returns a status report indicating that the user authentication is passed to data processor 5 (step S835), and data processor 5 issues a redirection instruction to request pages that are required (step S836).

Once it is confirmed that the present process is a user authentication process using a password in step S831, data processor 1 which runs program 208 then causes data processor 5 to return a status report requesting a password (step S832), and changes the screen displayed on terminal data processor 4 to a screen for entering a password.

If terminal data processor 4 uses a dedicated component thereon as a component for entering a password, then the image displayed on terminal data processor 4 does not need to be changed, but a password entry field is opened on the single image (step S833, process 2018 shown in FIG. 9).

Then, the system user enters a password and presses a finalizing key, whereupon the ID and the password are sent to data processor 5 through SSL communications (step S834). The ID and the password are received by data processor 5 (step S837). When data processor 1 is informed of the reception of the ID and the password by data processor 5, data processor 1 activates program 209 (step S838, process 2020 shown in FIG. 9).

Data processor 1 which runs program 209 checks the password for validity (step S839, process 2021 shown in FIG. 9). In step S840, the checked result from step S839 is confirmed. If it is confirmed that the entered password is not the same as a predetermined password, then a wait time is set in data processor 5 and terminal data processor 4 (step S841, step S842) until a re-request is made.

If it is confirmed that the entered password is the same as a predetermined password, data processor 1 then returns a status report indicating that the user authentication is passed to data processor 5 (step S843), and data processor 5 issues a redirection instruction to request pages that are required (step S844).

If settings are made not to use a password, it is then necessary to make an image display column sufficiently long.

The principles of the present invention are applicable to a personal authentication system for use in Internet banking and shopping sites, a personal authentication system for use with cellular phone terminals, and an authentication system for use in other built-in systems

What is claimed is:

1. A user data management apparatus connected to a terminal data processor used by a user through a network, for registering data dependent on a user ID particular to the user, comprising:

a data processor unit executing:

a first means for generating a first data registration screen when data of the user is to be initially registered, and a second data registration screen, wherein said user ID is created based on said initially registered data and said first and second data registration screens are displayed on a display of said terminal data processor; and a second means for generating an authentication screen and displaying said authentication screen on said display of said terminal data processor after data of the user is initially registered, said authentication screen being unique to each user and based on data of the user inputted to said first data registration screen generated by said first means, wherein the information corresponding to said authentication screen is transmitted over said network, wherein said first means i) produces first message digest character strings by combining a hashed character string obtained from any one of a plurality of elements making up said user ID and a plurality of constants assigned to predetermined image information, wherein the hashed character string is combined with each of the plurality of constants, ii) produces relocating identifiers particular to the user by sequentially sorting the message digest character strings, iii) masks a predetermined range of the image information relocating identifiers, and iv) generates said second data registration screen from the relocating identifiers outside of said predetermined range; and said second means i) dehashes said information corresponding to the second data registration screen generated by said first means to produce the constant assigned to said predetermined image information, ii) produces second message digest character strings by combining a hashed character string obtained from any element amongst those elements making up said user ID other than the element used to generate said hashed character string of said first data registration screen and the constant assigned to said predetermined image information, iii) sequentially sorts the second message digest character strings, iv) extracts the position of said constant, and v) extracts identifiers required to form an image at the position, thereby generating said authentication screen.

2. The user data management apparatus according to claim 1, wherein said second means issues a one-time session ID, including said user ID, to said terminal data processor before said authentication screen is displayed.

3. The user data management apparatus according to claim 1, wherein said second means issues a one-time session ID, including said user ID, to said terminal data processor before said authentication screen is displayed.

4. A method of managing user data on a user data management apparatus connected to a terminal data processor used by a user through a network, for registering data dependent on a user ID particular to the user, comprising the steps of:

generating a first data registration screen when data of the user is to be initially registered, and a second data registration screen, wherein said user ID is created based on said initially registered data displaying said first data registration screen on a display of said terminal data processor;

displaying said second data registration screen on said display of said terminal data processor;

generating an authentication screen, said authentication screen being unique to each user and based on data the user inputted to said first generated data registration screen, wherein the information corresponding to said authentication screen is transmitted over said network; and displaying said authentication screen on said display of said terminal data processor, wherein, said generating said second data registration screen step comprises the steps of i) producing first message digest character strings by combining a hashed character string obtained from any one of a plurality of elements making up said user ID and a constant assigned to predetermined image information, ii) producing relocating identifiers particular to the user by sequentially sorting the message digest character strings, iii) masking a predetermined range of the relocating identifiers, and iv) generating said second data registration screen from the relocating identifiers outside of said predetermined range; and said generating said authentication screen step comprises the steps of i) dehashing said second generated data registration screen generated to produce the constant assigned to said predetermined image information, ii) producing second message digest character strings by combining a hashed character string obtained from any element amongst those elements making up said user ID other than the element used to generate said hashed character string of said first data registration screen and the constant assigned to said predetermined image information, iii) sequentially sorting the second message digest character strings, iv) extracting the position of said constant, and v) extracting identifiers required to form an image at the position, thereby generating said authentication screen.

5. The method according to claim 4, wherein said step of generating said authentication screen comprises the step of assigning a one-time session ID, including said user ID, to said terminal data processor before said authentication screen is displayed.

6. The method according to claim 4, wherein said step of generating said authentication screen comprises the step of assigning a one-time session ID, including said user ID, to said terminal data processor before said authentication screen is displayed.

7. A user data registration apparatus for registering data dependent on a user ID particular to a user, comprising:

a display unit;

a first means for generating a first data registration screen when data of the user is to be initially registered, and a second data registration screen, wherein said user ID is created based on said initially registered data and said first and second data registration screens are displayed on a display of said display unit; a second means for generating an authentication screen and displaying said authentication screen on said display unit after data of the user is initially registered, said authentication screen being unique to each user and based on data of the user inputted to said first and second data registration screens generated by said first means; and a network connected between said display unit and at least one of said first means and second means, wherein the information corresponding to said authentication screen is transmitted over said network, wherein said first means i) produces first message digest character strings by combining a hashed character string obtained from any one of a plurality of elements making up said user ID and a constant assigned to predetermined image information, ii) produces relocating identifiers particular to the image information entered by the user by sequentially sorting the message digest character strings, iii) masks a predetermined range of the image information relocating identifiers, and iv) generates said second data registration screen from the relocating identifiers outside of said predetermined range; and said second means i) dehashes said information corresponding to the second data registration screen generated by said first means to produce the constant assigned to said predetermined image information, ii) produces second message digest character strings by combining a hashed character string obtained from any element amongst those elements making up said user ID other than the element used to generate said hashed character string of said first data registration screen and the constant assigned to said predetermined image information, iii) sequentially sorts the second message digest character strings, iv) extracts the position of said constant, and v) extracts identifiers required to form an image at the position, thereby generating said authentication screen.

8. A method of managing user data on a user data management apparatus having a display unit, for registering data dependent on a user ID particular to a user, comprising the steps of:

generating a first data registration screen when data of the user is to be initially registered, and a second data registration screen, wherein said user ID is created based on said initially registered data;

transmitting information corresponding to said first and second data registration screens over a network;

displaying said first and second data registration screens on said display unit; and generating an authentication screen and displaying, on said display unit, said authentication screen, said authentication screen being unique to each user and based on data the user inputted to said first and second data registration screens, wherein the information corresponding to said authentication screen is transmitted over said network, wherein said step of generating said second data registration screen comprises the steps of i) producing first message digest character strings by combining a hashed character string obtained from any one of a plurality of elements making up said user ID and a constant assigned to predetermined image information, ii) producing relocating identifiers particular to the user by sequentially sorting the message digest character strings, iii) masking a predetermined range of the relocating identifiers, and iv) generating said second data registration screen from the relocating identifiers outside of said predetermined range; and said step of generating said authentication screen comprises the steps of i) dehashing information corresponding to said second data registration screen to produce the constant assigned to said predetermined image information, ii) producing second message digest character strings by combining a hashed character string obtained from any element amongst those elements making up said user ID other than the element used to generate said hashed character string of said first data registration screen and the constant assigned to said predetermined image information, iii) sequentially sorting the second message digest character strings, iv) extracting the position of said constant, and v) extracting identifiers required to form an image at the position, thereby generating said authentication screen.

* * * * *